Figure 1:
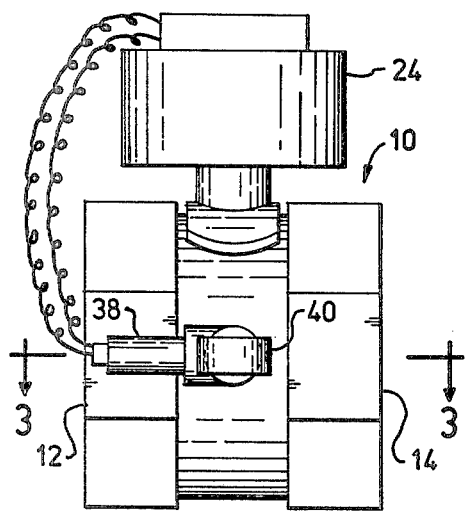

United States Patent [19]

Palma

[11] 4,210,169

[45] Jul. 1, 1980

[54] SPRINKLER CONTROL VALVE

[76] Inventor: Florencio N. Palma, 263 Keele St., Toronto, Ontario, Canada

[21] Appl. No.: 934,882

[22] Filed: Aug. 18, 1978

[51] Int. Cl.² ............................................. F16K 31/04
[52] U.S. Cl. .......................... 137/487.5; 137/624.13; 239/570
[58] Field of Search ........... 137/487.5, 624.13, 624.15, 137/624.14; 251/133; 239/570, DIG. 1, 99, 101

[56] References Cited

U.S. PATENT DOCUMENTS

| | | | |
|---|---|---|---|
| 1,743,545 | 1/1930 | Helphringer | 137/487.5 |
| 1,822,645 | 9/1931 | Crane | 137/487.5 |
| 1,931,771 | 10/1933 | Pinkerton | 137/487.5 X |
| 2,621,678 | 12/1952 | Snyder | 251/133 X |
| 2,720,420 | 10/1955 | Seifferle | 239/570 X |
| 3,948,285 | 4/1976 | Flynn | 239/570 X |
| 4,019,686 | 4/1977 | Palma | 239/569 X |

*Primary Examiner*—Alan Cohan

[57] ABSTRACT

A control valve for a water sprinkler has a passage therethrough and a rotary member under the control of a stepping motor or equivalent rotatable to increase and decrease the area of the passage. A sensor detects the output pressure at the valve and at a predetermined pressure reverses the direction of rotation of the stepping motor and rotary member.

4 Claims, 11 Drawing Figures

SPRINKLER CONTROL VALVE

This invention relates to a control valve for use with a sprinkler or sprinkler system and for insertion in the line between the water supply and the sprinkler head to control the water flow therebetween.

The type of sprinkler head with which the control valve is of utility is the type where the water pressure at the sprinkler head is used to cause reorientation of the sprinkler to cause the sprinkler to progress to water an area about the head. A particular example of such a sprinkler head is that shown in my U.S. Pat. No. 4,019,686 issued Apr. 26, 1977. This patent however, in addition to using the water pressure to cause rotation of the sprinkler head, is designed to create special and selectable sprinkler patterns. Thus it is important to note that the control valve here described is not limited to operating with the special sprinkler head of the aforesaid patent but may operate with any sprinkler head which uses water pressure to cause it to progressively alter its orientation.

The control valve which is the subject of this application is designed to progressively meter increasing amounts of water until predetermined upper output pressure is reached, then progressively meter decreasing amounts of water until a predetermined lower output pressure is reached and then to repeat the cycle. It is necessary, in order for such a valve to operate in conjunction with the supply pump and the sprinkler head, that the predetermined upper output pressure at the valve be less than the pump rating and greater than the pressure required at the sprinkler head to cause the latter to reorient itself.

The valve, operating in this way, delivers to the sprinkler head, water with a regular and predictable pattern of pressure variation and pressure maximum. This allows predictable operation of the sprinker head and predictable water delivery at each position.

The valve in accord with the invention, connected between the water supply and a sprinkler head whose orientation is controlled by water pressure, comprises a control valve body with a port for connection to the water supply line and a port for connection to the sprinkler head and a passage defined in the body between the ports. A controllable reversible rotary valve member is seated in the passage to move to progressively increase or decrease the aperture through which water may flow between the ports. Power means are provided to control the rotary movement of the valve member. A pressure sensor is located in the output port to sense the rise of pressure therein to the preset upper value. When this preset upper pressure value is reached, therefore, the sensor may detect this value and cause reversal of the power means. The power means will then progressively move the rotary member through its minimum aperture position to an angular position disposed in the other direction where the pressure has again reached the upper value and where the power means is again reversed. The cycle repeats. With each cycle of increasing pressure at the output port, the sprinkler head connected to the valve will be stepped to a new position. At each position of the sprinkler head the water pressure supplied varies in the same pattern with time the pattern being determined by the power means, the valve aperture and the pressure valve actuating the sensing means. The volume of water delivered by the sprinkler head, as distinct from the pressure, is determined by the mechanism and programming of the sprinkler head and does not directly form part of this invention.

Figure 2:
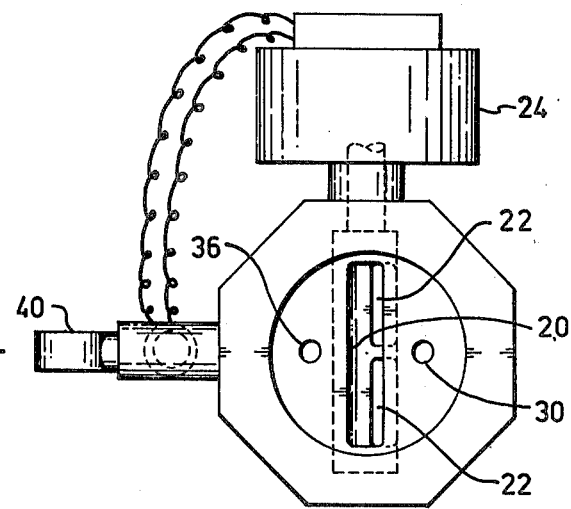
Figure 3:
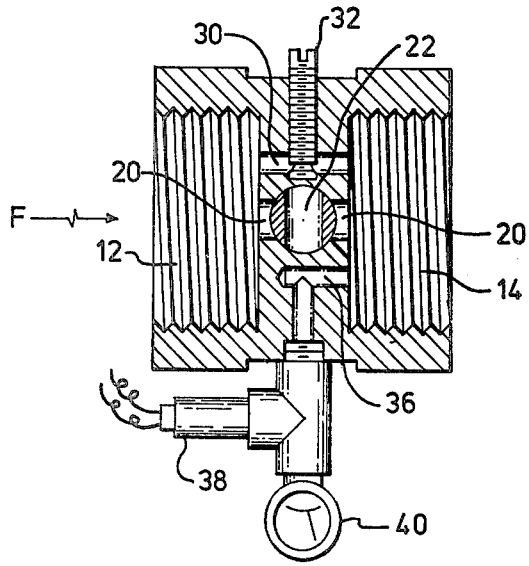
Figure 4:
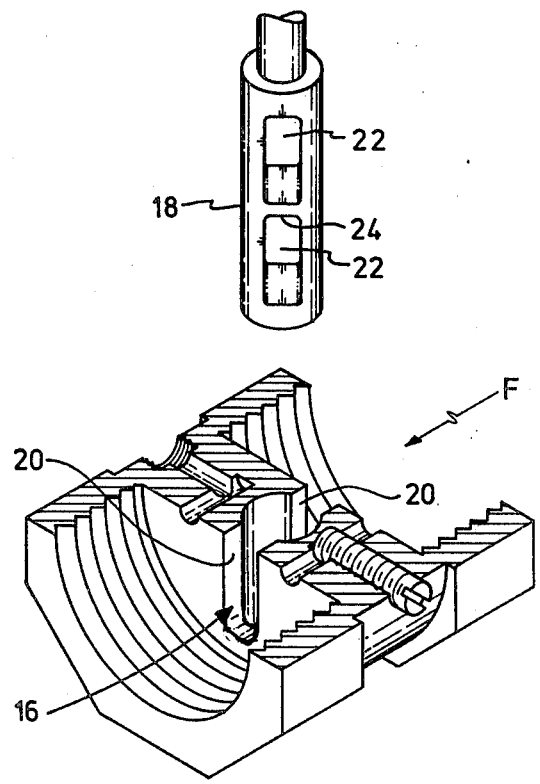
Figure 5:
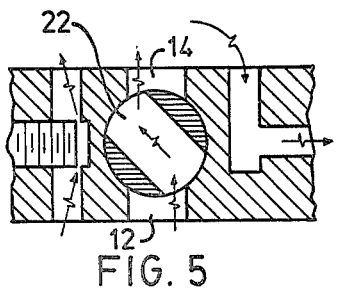
Figure 10:
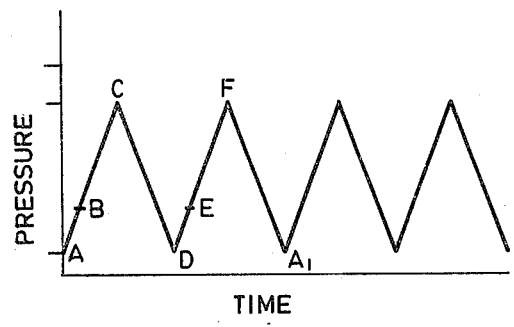
Figure 11:
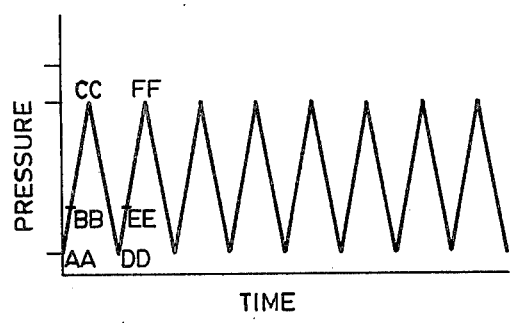

In drawings which illustrate a preferred embodiment of the invention:

FIG. 1 shows a side view of a valve in accord with the invention,

FIG. 2 shows a vertical cross-section through the valve, with the rotary valve at 45° to the closed position, FIG. 3 shows a horizontal cross-section taken along the lines 3—3 of FIG. 1, FIG. 4 is a partial and an exploded view showing the rotary valve control member, FIGS. 5–9 indicate the operation of the valve control member; and FIGS. 10 and 11 show schematically the relationship of pressure to time at the output port of a device in accord with the invention.

FIGS. 4–9 omit the pressure sensor and pressure guage for simplicity.

In the drawings the valve body 10 defines an input port 12, and output port 14 and a passage 16 between them. It will be noted that the body walls defining passage 16 define a cylindrical seat for the rotary valve member 18. In addition the walls defining passage 16 define apertures 20. Rotary valve member 18 is shaped to rotate slidably in the cylindrical seat. Rotary valve member 18 is provided with a pair of apertures 22 designed, on rotation of member 18, to move progressively into and out of alignment with apertures 20. It will be noted that the apertures are made as rectangular as possible, machining requirements rendering it preferably that the corners be slightly curved. It should also be noted that rotary valve member 18 may, so far as operation in accord with the invention is concerned, be provided with a single through aperture of the same cross section and height as apertures 20. The double apertures are preferred merely to allow the 'bridge' 24 therebetween to provide a more rigid valve member. It will be noted that the shapes of the apertures 20 and 22 are such as to produce a through aperture for water from the input to the output port which increases or decreases substantially proportionally to angular rotation of the valve member 18. When a constant stepping motor rotates the valve member at equal angular increments for equal increments of time the area of the through aperture (where a part a slot 22 meets a part of a slot 20) varies substantially proportionally with time. Alternative power sources to the stepping motor which provide equal angular movements in equal time are within the scope of the invention. It will be appreciated that other shapes of apertures 20 and 22 will produce such proportional variation with time, are within the scope of the invention.

Stepping motor 24 is mounted on the valve body and connected to rotatably drive the valve member 18. The stepping motor, as is conventional, is provided with a control to render it reversible, and is connected to a power supply not shown. I prefer to use, as my stepping motor, one manufactured by The Superior Electric Company, 383 Middle St., Bristol, Conn. USA 06010.

The body 10, as shown, may if desired, define a bypass connection being bore 30 between the inlet and outlet ports. An adjustment screw 32 threadedly mounted in the body is adjustable to control the flow through bore 30 between an upper value and full off. This bypass connectin is optional and will be provided where it is desired to have a minimum flow at times when the valve member 18 has completely shut off the flow through the main passage 16.

A passage 36 connects the water environment at the output port 14 to a pressure sensor 38 and preferably also with a pressure guage 40. The pressure sensor 38 is of the type which will be actuated to produce a control signal to reverse stepping motor 24 when the pressure rises to a predetermined value and will preferably be of the type where such preset value may be adjusted. As such a pressure sensor I prefer to use model 5-160 p.s.i. produced by Bailey and Mackey Ltd, Baltimore Road, Birmingham, U.K. B4Z 1DE.

The pressure guage 40 is a useful indicator of the output port 14 pressure, is not essential, but may be used to check the calibration of the pressure sensor 38.

The pressure sensor 38 and the control of the reversible stepping motor 24 are connected by any desired one of a number of readily available control means, to reverse the stepping motor when rising pressure at the output port passes the preset value. (The sensor controls and connection are designed so that no signal goes from the sensor to the motor as the output port pressure falls past the preset value.

In operation, the sensor 38 is set to provide its reversing signal at a pressure below that of the supply pump and at a pressure above that required to reorient the sprinkler head. In a usual arrangement a supply pump might be used providing an output water pressure of 150 p.s.i. and a sprinkler head might be provided which is actuated to move from one orientation to another at a water pressure rising to 30 p.s.i. The pressure sensor would then be set to provide an output signal at a pressure rising past 120 p.s.i.

Figure 6:
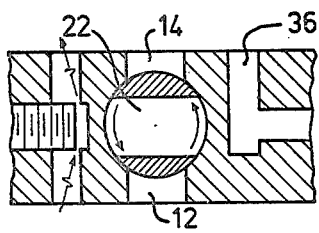
Figure 7:
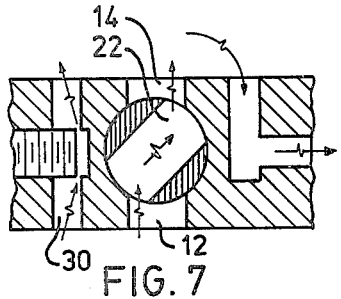
Figure 8:
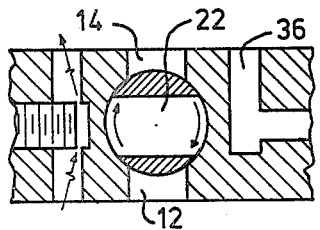
Figure 9:
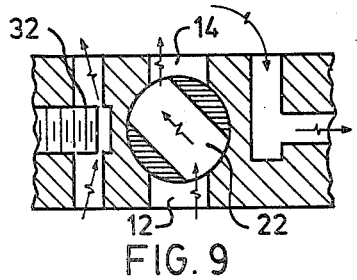

With the pump connected to the input port 12 and the sprinkler head connected to the output port 14, and the stepping motor 24 rotating valve member 18, the operation will be described commencing with FIG. 6 and FIG. 10. (FIG. 10 assumes a relatively wide aperture nozzle on the sprinkler). With the valve member in the position of FIG. 6, the water flow through main passage 16 is shut off and the only flow through the valve will be such as allowed through passage 30. This flow produces the minimum pressure, i.e. that at point A on FIG. 10. The sprinkler head will be at some orientation in its cycle and the stepping motor is stepping the valve counter-clockwise as viewed in FIGS. 6–10 and 5.

As the head moves counter-clockwise, the pressure rises along the line AC of FIG. 10 until the pressure at the output port has reached the value B, which will actuate the sprinkler head to rotate it to a new orientation. (Such rotation will encompass a finite amount of time, not shown on the graph, and only the initiation of rotation is indicated at point B). With the sprinkler head reaching the new position, the counter-clockwise rotation of the valve member 18 continues to the point C on FIG. 10 where the pressure sensor 38 detects the preset pressures with the valve member 18 then in the position of FIG. 7. The sensor 38 then provides the control signal to reverse the stepping motor 24 to cause the valve to move counter-clockwise toward the position of FIG. 8. At FIG. 8 the variable flow to the sprinkler head is at zero value and the pressure at the output port is indicated by point D on the graph. As the stepping motor 24 continues to rotate the member 18 clockwise, the member 18 moves toward the position of FIG. 9 (and FIG. 5). Before reaching the position of FIGS. 9 (and 5) the pressure will reach the value at point E on the graph (equal to the value at point B) and as a result of such pressure, the sprinkler head is again actuated to the next position. The rotation of the valve by motor 24 is again reversed by the sensor when the pressure represented by point F on the graph is reached. The rotation of the valve then becomes counter-clockwise until the pressure corresponds to point A1 on the graph, and the position of FIG. 6 of the drawings is reached. The cycle then repeats.

FIG. 10 shows the operation of the device connected to a sprinkler head having a wide aperture. The cycle distance B–E on the graph represents the pressure time relationship at a single sprinkler orientation. The area under the graph from B to E varies as (although not directly proportional to) the quanity of water delivered at a single sprinkler orientation.

The events depicted by FIG. 10 with a wide sprinkler aperture may be compared with those represented by FIG. 11 with a narrower aperture. It will be noted that with a smaller sprinkler, the required output pressure will be attained with a smaller through aperture in passage 16. Thus while the operation is similar to that described in relation to FIGS. 6–10 and 5 the maximum angular excursions caused by the stepping motor before reversal will be less than those represented at FIGS. 5 and 9 on the one hand and FIG. 7 on the other. Fewer steps of the stepping motor will therefore be required between off and the maximum excursion and the graph is represented by FIG. 11 where the letters AA, DD represent the closed positions, BB and EE initiation of rotation of the sprinkler head, CC and FF reversal of the stepping motor. Thus it will be seen, by joint consideration of FIGS. 10 and 11 that the valve in accord with the invention will provide predictable, programmable and consistent sprinkler action regardless of the sprinkler head aperture connected thereto and that the volume of water delivered will vary as the sprinkler head aperture size.

Further a single valve may be connected to one, or a number of sprinkler heads. The operation of the valve would be analogous to that represented if FIG. 11 represented the operation with one sprinkler head connected to the output port 14 and FIG. 12 represented the operation with two sprinkler heads so connected.

I claim:

1. Control valve for producing cyclically increasing and decreasing water supply, comprising:
    a valve body,
    a port in said body for connection to a water supply line,
    a port in said body for connection to a water output line,
    means defining a passage in said body between said ports,
    a rotary member rotatable to control the aperture size in said passage,
    a controllable, reversible means for progressively continually rotating the rotary member,
    pressure sensing means located to sense water pressure on the downstream side of said aperture designed to provide an output signal when said water pressure rises above a predetermined value,
    control means for controlling said controllable reversible means, responsive to said output signal to reverse the direction of rotation of said valve member,
    said rotating means and said control means being connected and designed so that said rotating means continues to rotate the rotary member in the same direction between said output signals.

2. A device for use as claimed in claim 1 wherein said aperture size control member is a rotatable apertured spindle arranged to align its aperture in various degrees with said passage.

3. A device as claimed in claim 1 wherein said controllable reversible means is a stepping motor.

4. A device as claimed in claim 2 wherein said controllable reversible means is a stepping motor.

* * * * *